(12) United States Patent
Wentink

(10) Patent No.: US 9,374,201 B2
(45) Date of Patent: Jun. 21, 2016

(54) PACKET NUMBER DETERMINATION MECHANISM

(71) Applicant: QUALCOMM Incorporated, San Diego, CA (US)

(72) Inventor: Maarten Menzo Wentink, Naarden (NL)

(*) Notice: Subject to any disclaimer, the term of this patent is extended or adjusted under 35 U.S.C. 154(b) by 0 days.

(21) Appl. No.: 14/554,265

(22) Filed: Nov. 26, 2014

(65) Prior Publication Data
US 2015/0172004 A1    Jun. 18, 2015

Related U.S. Application Data

(60) Provisional application No. 61/929,303, filed on Jan. 20, 2014, provisional application No. 61/925,434, filed on Jan. 9, 2014, provisional application No. 61/918,838, filed on Dec. 20, 2013, provisional application No. 61/917,036, filed on Dec. 17, 2013.

(51) Int. Cl.
*H04W 4/00* (2009.01)
*H04L 1/18* (2006.01)
*H04L 12/801* (2013.01)
*H04L 12/807* (2013.01)

(52) U.S. Cl.
CPC ............ *H04L 1/1832* (2013.01); *H04L 1/1809* (2013.01); *H04L 47/27* (2013.01); *H04L 47/34* (2013.01)

(58) Field of Classification Search
None
See application file for complete search history.

(56) References Cited

U.S. PATENT DOCUMENTS

2004/0062248 A1*  4/2004  Nagarajan ............... H04L 45/00
                                                             370/394

OTHER PUBLICATIONS

International Search Report and Written Opinion—PCT/US2014/067795—ISA/EPO—Feb. 17, 2015.

* cited by examiner

*Primary Examiner* — Afshawn Towfighi
(74) *Attorney, Agent, or Firm* — Patterson & Sheridan, LLP

(57) ABSTRACT

Certain aspects of the present disclosure provide methods and apparatuses for determining a packet number for a packet, based on a transmit packet number (TPN), transmitted with the packet, a locally maintained base packet number (BPN), and a value of the TPN relative to one or more edges of a locally-maintained receive window. An example method generally includes receiving a packet having a transmitted packet number (TPN), maintaining a base packet number (BPN), maintaining a receive window defined by a first edge a and a second edge b, determining a value i of the TPN relative to at least one of the first edge a or the second edge b of the receive window, and calculating a packet number (PN) for the packet based on the TPN, the BPN, and the determination.

26 Claims, 10 Drawing Sheets

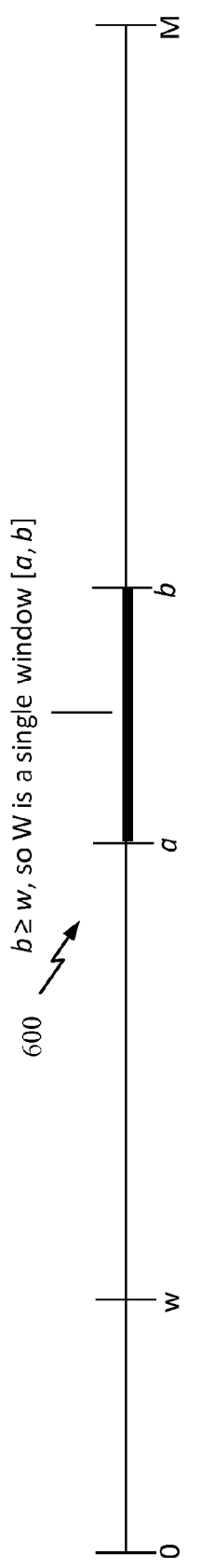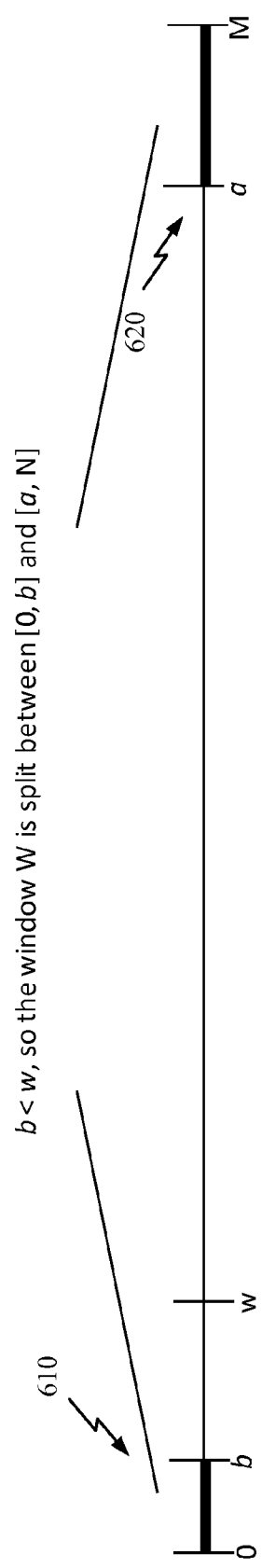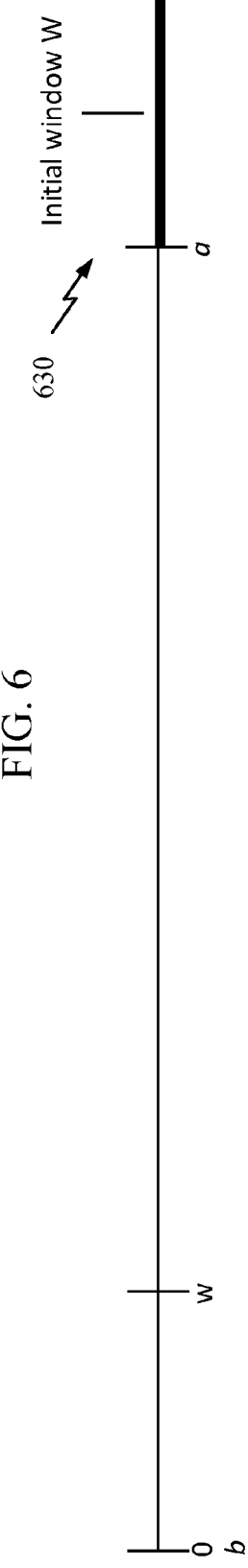
FIG. 6
FIG. 7

PACKET NUMBER DETERMINATION MECHANISM

CROSS-REFERENCE TO RELATED APPLICATIONS

This application claims benefit of U.S. Provisional Patent Application Ser. No. 61/917,036, entitled "Packet Number Determination Mechanism," filed Dec. 17, 2013; U.S. Provisional Patent Application Ser. No. 61/918,838, entitled "Packet Number Determination Mechanism," filed Dec. 20, 2013; U.S. Provisional Patent Application Ser. No. 61/925,434, entitled "Packet Number Determination Mechanism," filed Jan. 9, 2014; and U.S. Provisional Patent Application Ser. No. 61/929,303, entitled "Packet Number Determination Mechanism," filed Jan. 20, 2014, each of which is assigned to the assignee hereof, the contents of which are herein incorporated by reference.

BACKGROUND

1. Field of the Invention

Certain aspects of the present disclosure generally relate to wireless communications and, more particularly, to techniques for correctly determining packet numbers in scenarios when a base packet number rolls over.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provide an apparatus for wireless communications. The apparatus typically includes an interface configured to receive a packet having a transmitted packet number (TPN) and a processor configured to maintain a base packet number (BPN), maintain a receive window defined by a first edge a and a second edge b, determine a value i of the TPN relative to at least one of the first edge a or the second edge b of the receive window, and calculate a packet number (PN) for the packet based on the TPN, the BPN, and the determination.

Certain aspects of the present disclosure provide a method for wireless communications by an apparatus. The method typically includes receiving a packet having a transmitted packet number (TPN), maintaining a base packet number (BPN), maintaining a receive window defined by a first edge a and a second edge b, determining a value i of the TPN relative to at least one of the first edge a or the second edge b of the receive window, and calculating a packet number (PN) for the packet based on the TPN, the BPN, and the determination.

Certain aspects of the present disclosure provide an apparatus for wireless communications by an apparatus. The apparatus typically includes means for receiving a packet having a transmitted packet number (TPN), means for maintaining a base packet number (BPN), means for maintaining a receive window defined by a first edge a and a second edge b, means for determining a value i of the TPN relative to at least one of the first edge a or the second edge b of the receive window, and means for calculating a packet number (PN) for the packet based on the TPN, the BPN, and the determination.

Certain aspects of the present disclosure provide a computer program product for wireless communications by an apparatus comprising a computer-readable medium having instructions stored thereon. The instructions are generally executable for receiving a packet having a transmitted packet number (TPN), maintaining a receive window defined by a first edge a and a second edge b, determining a value i of the TPN relative to at least one of the first edge a or the second edge b of the receive window, and calculating a packet number (PN) for the packet based on the TPN, the BPN, and the determination.

Certain aspects of the present disclosure provide a station for wireless communications. The station typically includes at least one antenna, a receiver configured to receive, via the at least one antenna, a packet having a transmitted packet number (TPN), and a processor configured to maintain a base packet number (BPN), maintain a receive window defined by a first edge a and a second edge b, determine a value i of the TPN relative to at least one of the first edge a or the second edge b of the receive window, and calculate a packet number (PN) for the packet based on the TPN, the BPN, and the determination.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 6-8 illustrate use of a regular receive window with continuous and a receive window with split segments, in accordance with certain aspects of the present disclosure.

DETAILED DESCRIPTION

Figure 1:
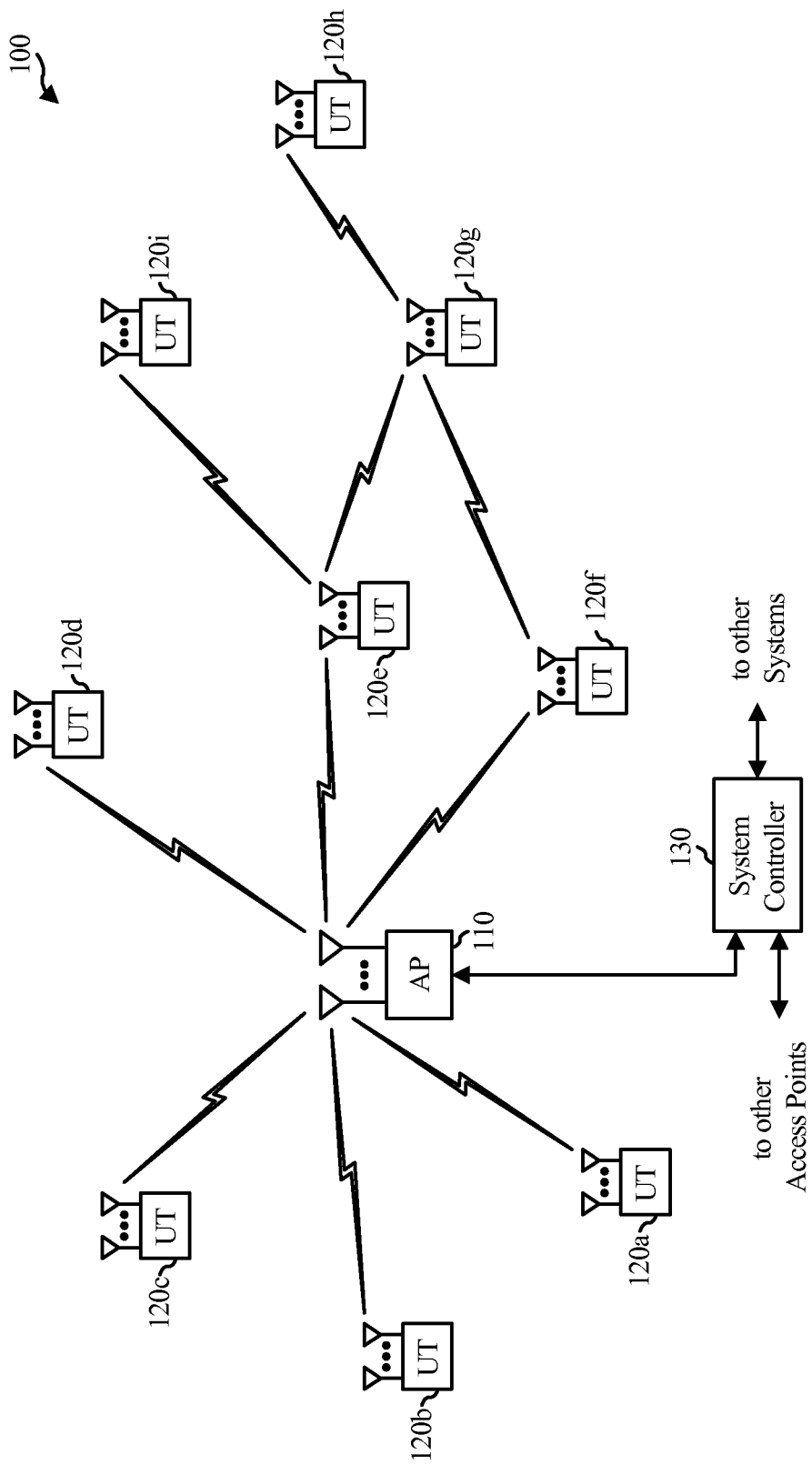
FIG. 1 illustrates a diagram of an example wireless communications network, in accordance with certain aspects of the present disclosure.

Network packets may be identified by a packet number transmitted in the packet. To reduce the amount of overhead involved in transmitting a packet number in a packet, the packet number may be split into a base packet number and a transmitted packet number. Doing so may result in difficulties in maintaining a receive window at a receiver, for example, when packets are received out of order (e.g., a packet with a later packet number is received before a packet with an earlier packet number). Aspects of the present disclosure provide for correct determination of a packet number (and maintenance of a receive window) when a split packet number is used in transmission of packets.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals in which aspects of the present disclosure may be practiced. For example, access point 110 or user terminals 120 may determine packet numbers utilizing techniques described herein.

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
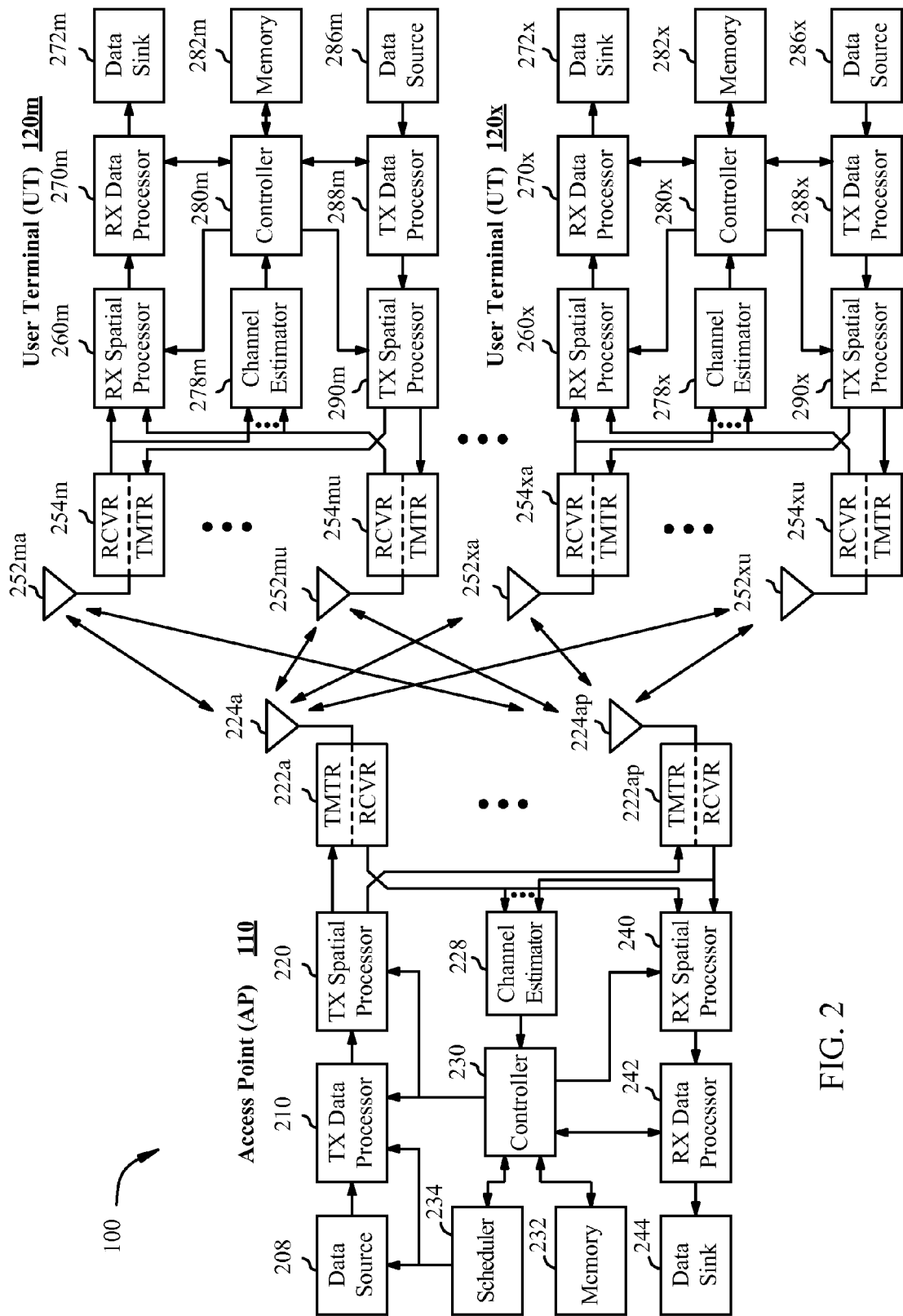
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100 in which aspects of the present disclosure may be practiced. As discussed above, the packet number determination techniques discussed herein may be practiced by an access point 110 or user terminal 120.

The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

According to certain aspects of the present disclosure, the processors 210 and 270 may direct the operation at an access point 110 and/or user equipment 120, respectively, to perform various techniques described herein. For example, RX data processor 270, controller 280, and/or other processors and modules at the user equipment (acting as a receiver system) may perform or direct operations 500 in FIG. 5 to calculate a packet number based on a received partial packet number and/or other processes for the techniques described herein. TX data processor 210, controller 230, and/or other processors and modules at the access point (eNodeB) (acting as a receiver system) may also perform or direct operations 500 in FIG. 5. However, any other processor or component in FIG. 2 may perform or direct operations 500 in FIG. 5 and/or other processes for the techniques described herein.

Figure 3:
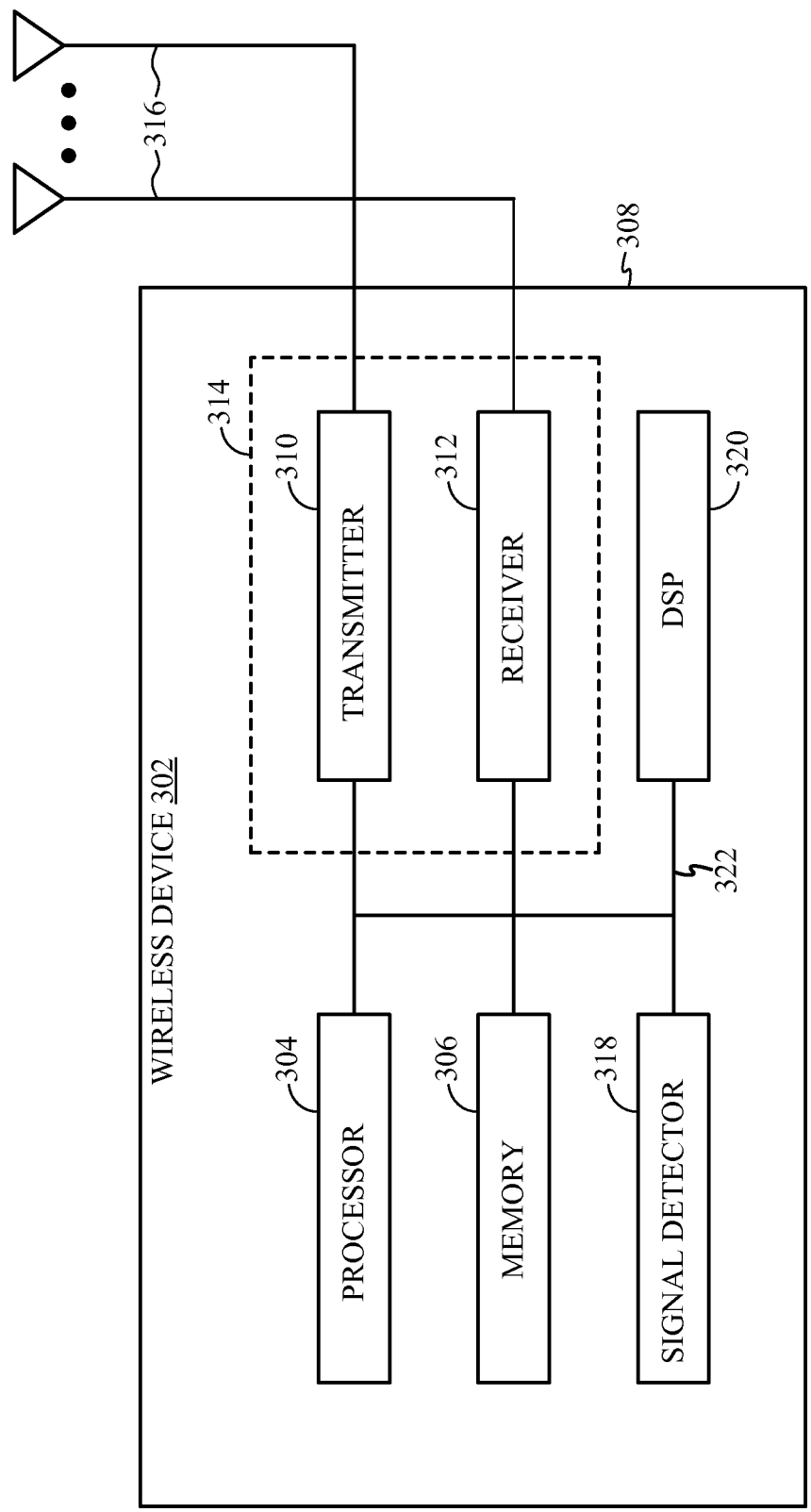
FIG. 3 illustrates a block diagram of an example wireless device, in accordance with certain aspects of the present disclosure.

FIG. 3 illustrates various components that may be utilized in a wireless device 302 in which aspects of the present disclosure may be practiced and that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein. Processor 304 may, for example, perform or direct operations 500 in FIG. 5 to calculate a packet number based on a received partial packet number and/or other processes for the techniques described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Aspects of the present disclosure may be used to properly determine a packet number for a received packet, based on a locally stored base packet number (BPN) and a transmitted packet number (TPN) received in the packet.

Figure 4:
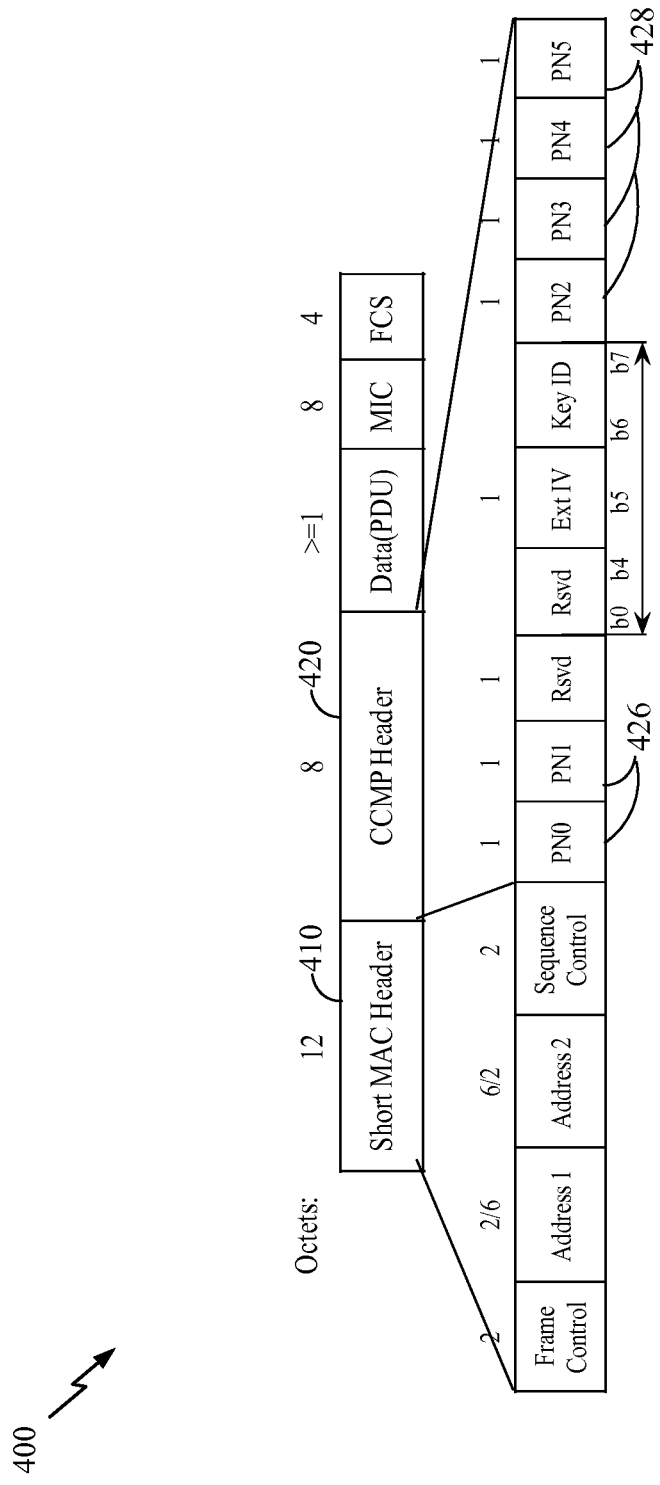
FIG. 4 illustrates an example packet structure, in accordance with certain aspects of the present disclosure.

FIG. 4 illustrates an example of a packet 400 (e.g., an MPDU) for which aspects of the present disclosure may be used to calculate a packet number. As illustrated, the packet 400 may have a short MAC header 410, a CCMP header 420, a Message Integrity Code (MIC) and a frame check sequence (FCS).

As illustrated, the CCMP header 420 may have a packet number (PN), and a key ID octet 422 with an Ext IV field and a key ID field. As illustrated, the packet number is a 48-bit number stored across 6 octets (as illustrated, the PN codes may be conveyed in the first two octets 426 and last four octets 428 of the CCMP header 420) and are incremented for each subsequent packet.

Example Packet Number Determination Mechanism

Certain MAC Protocol Data Units (MPDUs) may have a packet number (PN) which may include a part transmitted in the data unit and a base part stored locally at each STA. The transmitted part is referred to as the transmitted packet number (TPN). The base part is referred to as the base packet number (BPN). When block acknowledgment is used, packets may arrive out of order at the receiver within a certain window W, which may present problems in maintaining the BPN at the receiver. The window W can be a multiple of the Block Ack window size.

Aspects of the present disclosure provide a mechanism to maintain a receive window W at the receiver, with a size (width) w. The receive window may be determined based on the value of the first and second edges, for example, an upper edge of the window, b, as follows, wherein a is the lower edge of the window.

Figure 5:
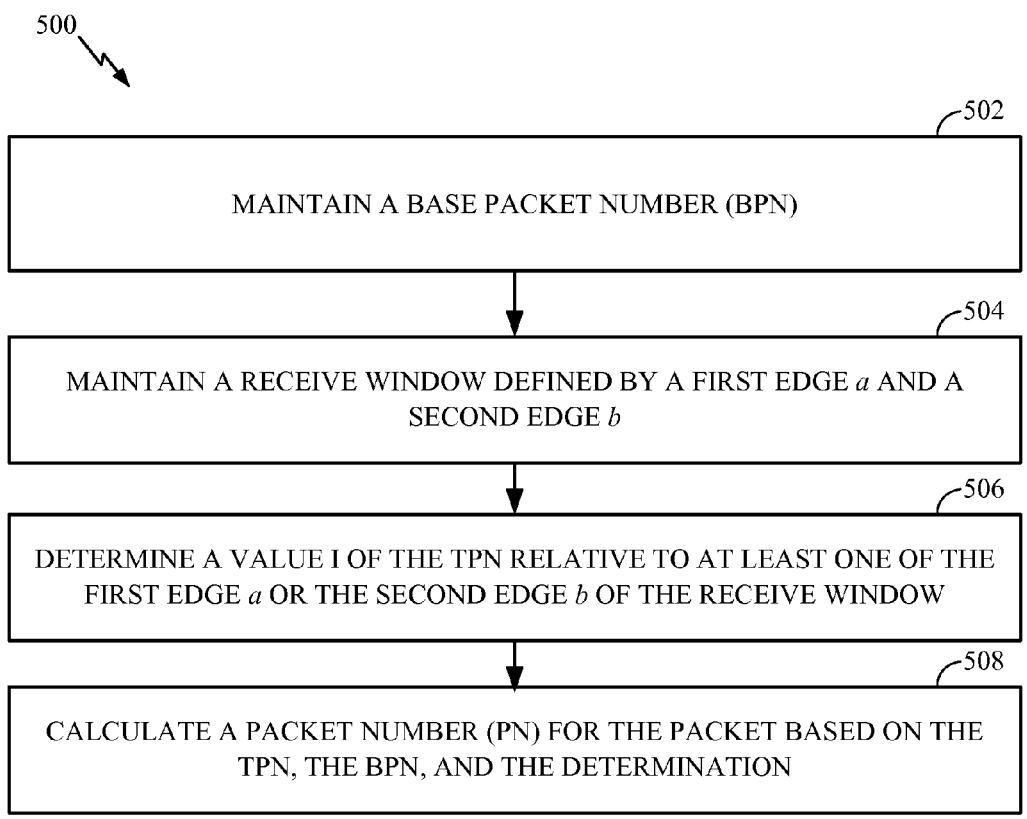
FIG. 5 illustrates a block diagram of example operations for wireless communications by a receiver, in accordance with certain aspects of the present disclosure.

FIG. 5 is a block diagram of example operations 500 for calculating a packet number, in accordance with aspects of the present disclosure. The operations 500 may be performed by an apparatus, such as a receiving station (RX-STA) or access point involved in a communications session.

At 502, the apparatus maintains a base packet number (BPN). At 504, the apparatus maintains a receive window defined by a first edge a and a second edge b.

At 506, the apparatus determines a value i of the TPN relative to at least one of the first edge a or the second edge b of the receive window. At 508, the apparatus calculates a packet number (PN) for the packet based on the TPN, the BPN, and the determination. As will be described in greater detail below, the apparatus may also adjust (a and b for) the receive window W for subsequent packets based on whether i lies within the current receive window W.

As illustrated in FIG. 6, the receive window W may be maintained as either a single window or a split window (with discontinuous segments), depending on the upper edge of the window b relative to the size of the window w. As illustrated, if b≥w the receive window W may be maintained as a single window 600 having a continuous segment from a to b. On the other hand, if b<w, the receive window W may be maintained as a split window with a first segment 610 from 0 to b and a second segment 620 from a to M, where M is an upper bound of the window W and of the value i of the transmitted packet number (TPN). The determination of the receive window W may, thus be described as:
 if b≥w
  a=b−w
  W=[a, b] (single window)
 else (if b<w)
  a=b+M−w
  W=[0, b]+[a, M] (split window)

As illustrated in FIG. 7, the receive window 630 may be initialized as an initial window W. With this initialization, the packet window is comprised of intervals [0, 0] and [M−a, M]. This initialization may be described as:
 b=0
 a=M−w
 BPN=0

Figure 8:
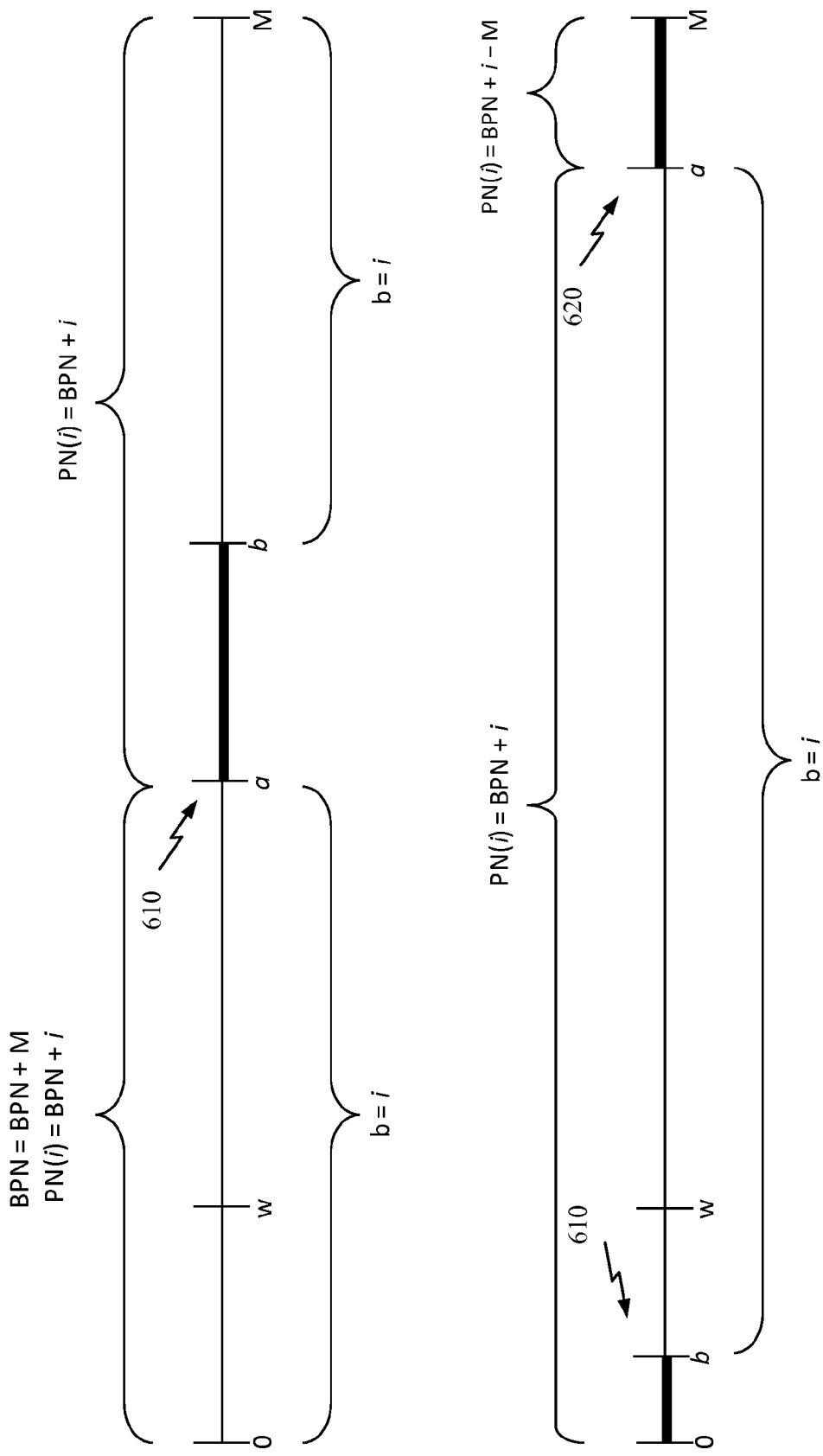

When a receiver receives a packet with a transmitted packet number (TPN) the receiver may determine the actual packet number based on i, and a BPN, which may be adjusted based on whether or not i is within the receive window. A receive procedure, to calculate a packet number based on a TPN i received in a packet, is illustrated in FIG. 8 and may be described as:
 If there is a single window
  if i<a, increment the BPN by M
  PN(i)=BPN+i
 else (i.e. there is a split window)
  if i<a, PN(i)=BPN+i
  else, PN(i)=BPN+i−M
For any i not in the receive window W, set b=i and determine the new window according to the determination procedure above.

Figure 9:
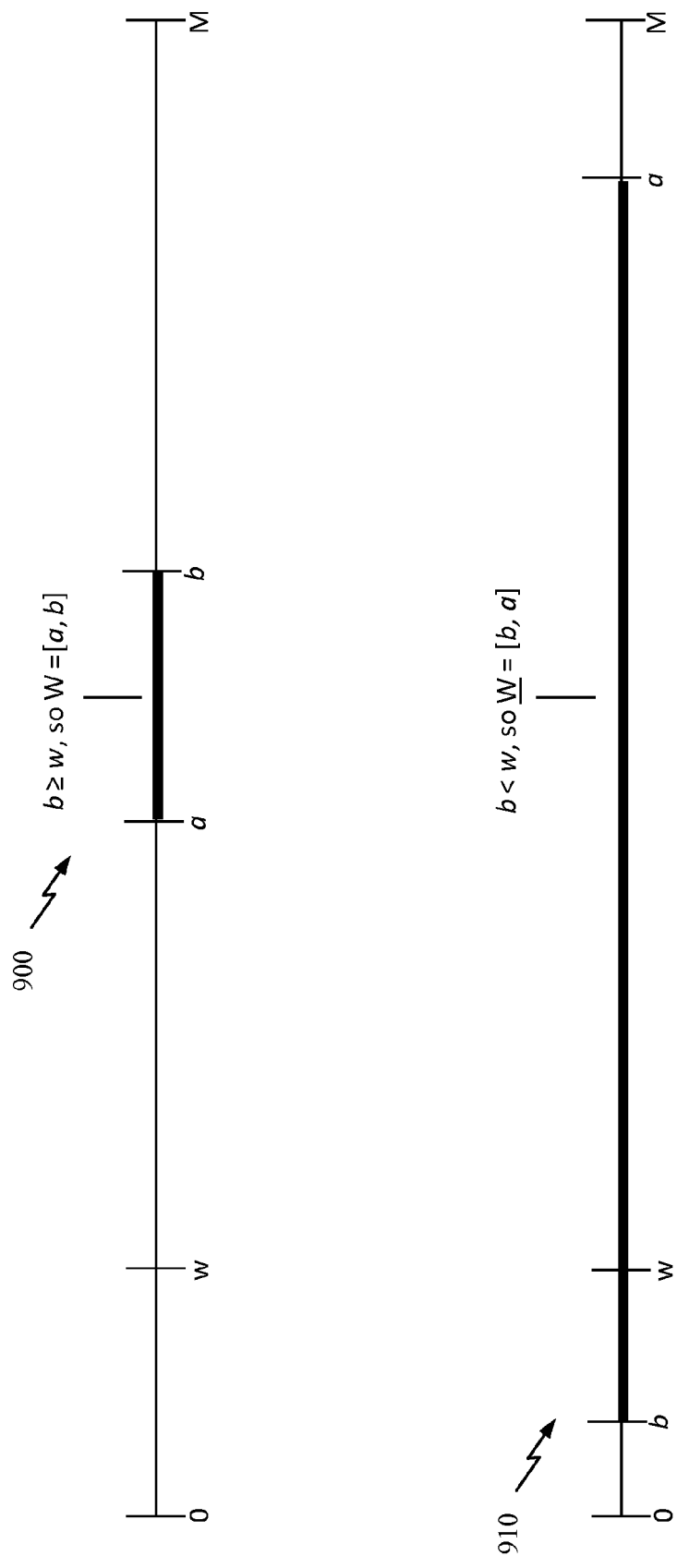
FIGS. 9-10 illustrate use of a regular receive window with continuous segments and an inverse window, in accordance with certain aspects of the present disclosure.
Figure 10:
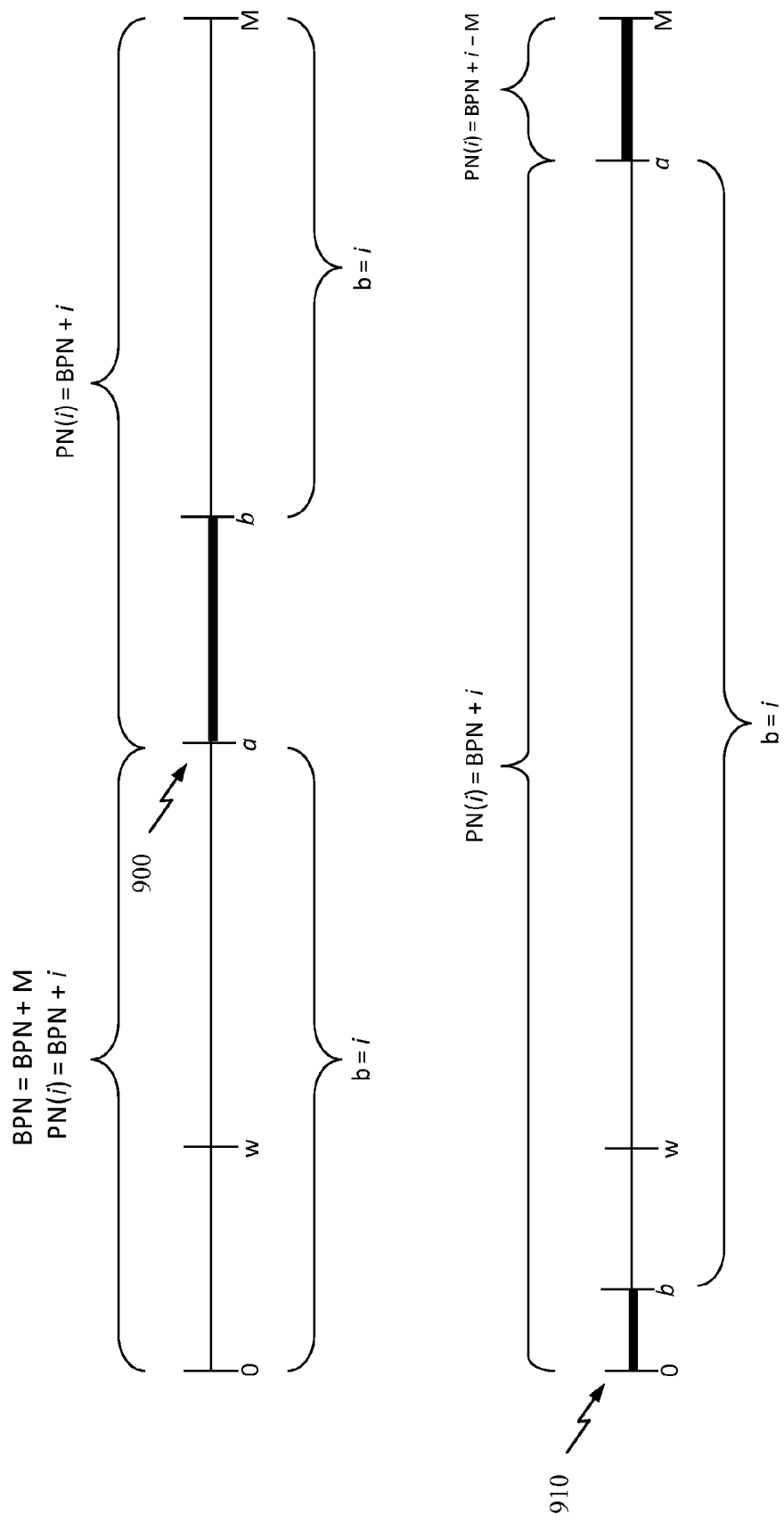

Rather than maintaining a single window or split window, an apparatus may maintain a regular window W and an inverse window W̅. As illustrated in FIG. 9, a regular window W 900 may exist when b≥w, an inverse window W̅ 910 may exist otherwise (i.e. when b<w). A receive procedure, to calculate a packet number based on a TPN i received in a packet, is illustrated in FIG. 10 and may be described as:
 if b≥w (normal receive window W)
  if i<a (BPN rollover occurred)
   BPN=BPN+M (increment BPN)
   PN(i)=BPN+i (determine PN of received packet)
  else (i.e. i≥a) (no BPN rollover occurred)
   PN(i)=BPN+i (determine PN of received packet)
  if i<a or i>b (i outside W)
   b=i (update window upper edge)
 else (i.e. b<w) (inverse receive window W̅)
  if i<a (current BPN)
   PN(i)=BPN+i (determine PN of received packet)
  else (i.e. i>a)
   PN(i)=BPN+i−M (determine PN of received packet from prior BPN)
  if i>b and i<a (i in W̅)
   b=i (update window upper edge)

In an embodiment, the transmitted packet number (TPN) may be the Sequence Number (SN) that is included in a sequence control (SC) field of the MAC header of the received MPDU, and the packet number (PN) of the received MPDU may be generated by concatenating the SC field with a base packet number (BPN), possibly after updating the BPN according to the following receive procedure. A receive procedure to calculate a packet number based on an SN received in a packet may be described as: A receive procedure, to calculate a packet number based on a TPN i received in a packet, is illustrated in FIG. 10 and may be described as:
 if b≥w
  a=b−w
  if (SN<a) then BPN=BPN+1
  PN=SC||BPN
  if not (a<SN<b) then b=SN
 else (i.e. b<w) then
  a=b−w+M
  if (SN<a) then PN=SC||BPN
  if (SN≥a) then SN=SC||(BPN−1)
  if (b<SN<a) then b=SN
 where || denotes concatenation, BPN+1 denotes the next higher BPN and BPN −1 denotes the next lower BPN.

When a received packet that causes the BPN to be increased by 1 subsequently fails authentication (e.g. the Message Integrity Check (MIC) fails), the BPN increase may be undone (e.g., the BPN may be restored to the pre-incremented value). A packet that fails authentication could be an old packet, which may be a packet with a sequence number older than a. Typically such old packets are not transmitted because all transmissions are within the Block Ack reorder window, and the Block Ack reorder window is smaller than the sequence number window w. However, if old packets are transmitted accidentally, as in some implementations, the BPN need not be increased. In some cases, a packet that fails authentication may be a packet that was sent on purpose by an attacker with the intent to cause the BPN to be incremented when the BPN should not be incremented. Such a change to the BPN may thus cause all subsequently received regular packets to fail authentication and decryption because the BPN is wrong. Such a situation amounts to a denial of service attack. A packet causes the BPN to be increased by 1 when b≥w and SN<a (where a=b−w and SN is the sequence number of the packet).

Figure 5A:
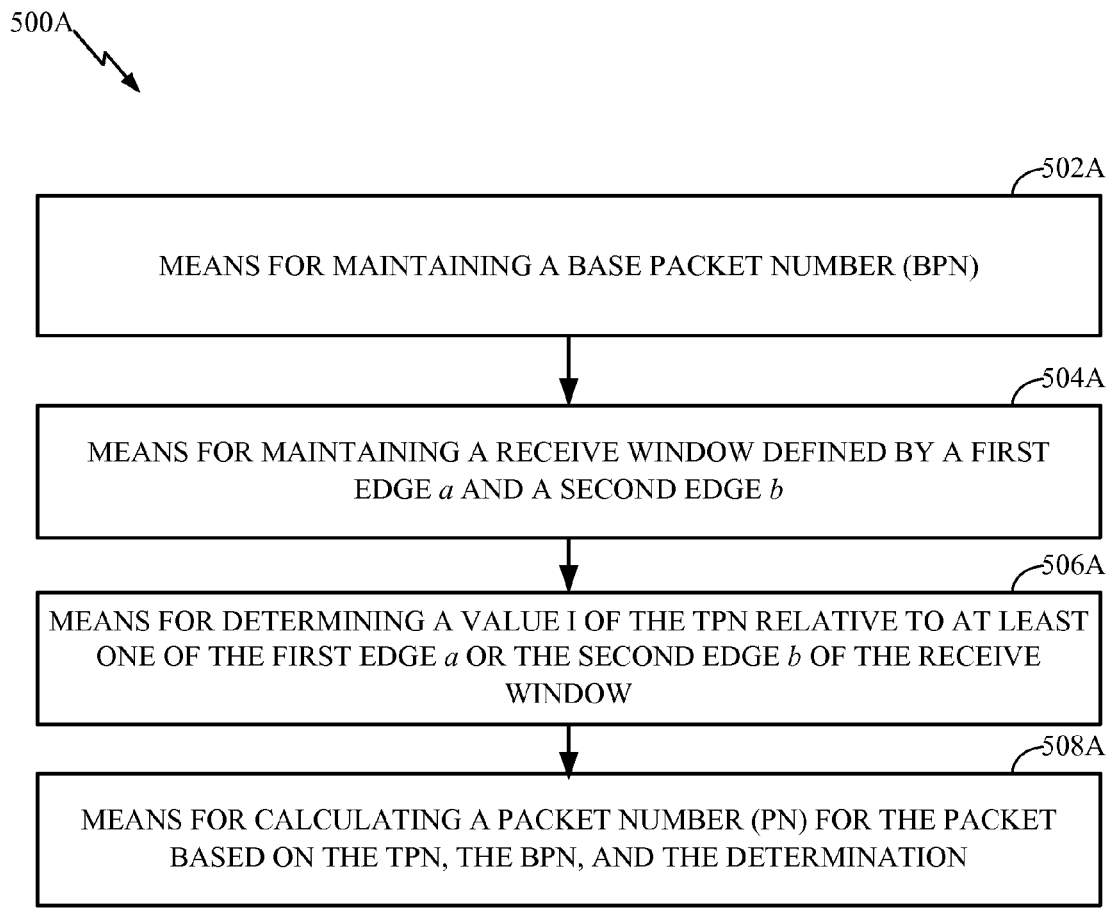
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 illustrated in FIG. 5 correspond to means 500A illustrated in FIG. 5A.

For example, means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for processing, means for determining, or means for calculating comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

In some cases, rather than actually transmitting a frame a device may have an interface to output a frame for transmission. For example, a processor may output a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for reception.

According to certain aspects, such means may be implemented by processing systems configured to perform the corresponding functions by implementing various algorithms (e.g., in hardware or by executing software instructions) described above for calculating a packet number.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, and any combination of any number of a, b, or c (e.g., aa, bb, cc, and so on).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
an interface configured to receive a packet having a transmitted packet number (TPN); and
a processing system configured to:
    maintain a base packet number (RPN),
    maintain a receive window defined by a first edge a and a second edge b, wherein the receive window is maintained, with the first edge a as a lower edge and the second edge b as an upper edge, as:
        a single window with a continuous segment between the lower edge a and upper edge b if $b \geq w$, wherein w is a width of the receive window, or
        a split window with discontinuous windows if $b < w$,
    determine a value i of the TPN relative to at least one of the first edge a or the second edge b of the receive window, and
    calculate a packet number (PN) for the packet based on the TPN, the BPN, and the determination.

2. The apparatus of claim 1, wherein the determination of the value i comprises:
determining whether or not $a \leq i \leq b$ if the receive window is maintained as a single window; or
determining whether or not $0 \leq i \leq b$ or $a \leq i \leq M$, where M is an upper bound of the window, if the receive window is maintained as a split window.

3. The apparatus of claim 1, wherein, if there is a single window, the processing system is configured to:
increment BPN by M if $i < a$; and
calculate the PN of the packet as: $PN(i) = BPN + i$.

4. The apparatus of claim 3, wherein the processing system is further configured to:
detect the packet has failed an authentication check; and
in response to the detection, restore the BPN to its value prior to incrementing.

5. The apparatus of claim 1, wherein, if there is a split window, the processing system is configured to calculate the PN of the packet as:
$PN(i) = BPN + i$, if $i < a$; or
$PN(i) = BPN + i - M$, if $i \geq a$.

6. The apparatus of claim 1, wherein, if the value i is outside the receive window, the processing system is configured to update the receive window by setting $b = i$ and:
if $b \geq w$, setting $a = b - w$; or
if $b < w$, setting $a = b + M - w$, where M is an upper bound of the window.

7. The apparatus of claim 1, wherein the processing system is further configured to initialize the receive window by setting b=0 and setting a=M−w, where w is a width of the receive window and M s an upper bound of the window.

8. An apparatus for wireless communications, comprising:
an interface configured to receive a packet having a transmitted packet number (TPN); and
a processing system configured to:
maintain a base packet number (BPN),
maintain a receive window defined by a first edge a and a second edge b, wherein the receive windows is maintained as:
a continuous segment with the first edge a as a lower edge and the second edge b as an upper edge if b≥w, where w is a width of the continuous segment; or
an inverse window with the second edge b as a lower edge and the first edge a as an upper edge if b<w,
determine a value i of the TPN relative to at least one of the first edge a or the second edge b of the receive window, and
calculate a packet number (PN) for the packet based on the TPN, the BPN, and the determination.

9. The apparatus of claim 8, wherein the determination of the value i comprises:
determining whether or not a≤i≤b if the receive window is maintained as a continuous segment with the first edge a as a lower edge and the second edge b as an upper edge; or
determining whether or not b≤i≤a, if the receive window is maintained as an inverse window.

10. The apparatus of claim 8, wherein, if b≥w, the processing system is configured to:
increment BPN by M, if i<a;
calculate the PN of the packet as PN(i)=BPN+i; and
set b =i, if i<a or if i>b.

11. The apparatus of claim 10, wherein the processing system is further configured to:
detect the packet has failed an authentication check; and
in response to the detection, restore BPN to its value prior to incrementing.

12. The apparatus of claim 8, wherein, if b<w, the processing system is configured to:
calculate the PN of the packet as PN(i)=BPN+i, if i<a;
calculate the PN of the packet as PN(i)=BPN+i−M, if i≥a; and
set b=i, if i<a and i>b.

13. The apparatus of claim 8, further comprising at least one antenna coupled to the interface via which the packet is received, wherein the apparatus is configured as a wireless station.

14. A method for wireless communications, comprising:
receiving a packet having a transmitted packet number (TPN);
maintaining a base packet number (BPN);
maintaining a receive window defined by a first edge a and a second edge b, wherein the receive window is maintained, with the first edge a as a lower edge and the second edge b as an upper edge, as:
a single window with a continuous segment between the lower edge a and upper edge b if b≥w, wherein w is a width of the receive window; or
a split window with discontinuous segments if b<w;
determining a value i of the TPN relative to at least one of the first edge a or the second edge b of the receive window; and
calculating a packet number (PN) for the packet based on the TPN, the BPN, and the determination.

15. The method of claim 14, wherein determining the value i comprises:
determining whether or not a≤i≤b if the receive window is maintained as a single window; or
determining whether or not 0≤i≤b or a≤i≤M, where M is an upper bound of the window, if the receive window is maintained as a split window.

16. The method of claim 14, further comprising, if there is a single window:
incrementing BPN by M if i<a; and
calculating the PN of the packet as: PN(i)=BPN+i.

17. The method of claim 16, further comprising:
detecting the packet has failed an authentication check; and
in response to the detection, restoring BPN to its value prior to incrementing.

18. The method of claim 14, comprising, if there is a split window, calculating the PN of the packet as:
PN(i)=BPN+i, if i<a; or
PN(i) 32 BPN+i−M, if i≥a.

19. The method of claim 14, further comprising, if the value i is outside the receive window, updating the receive window by setting b=i and:
if b≥w, setting a=b−w; or
if b<w, setting a=b+M−w, where M is an upper bound of the window.

20. The method of claim 14, further comprising initializing the receive window by setting b=0 and setting a=M−w, where w is a width of the receive window and M is an upper bound of the window.

21. A method for wireless communications, comprising:
receiving packet having a transmitted packet number (TPN);
maintaining a base packet number (BPN);
maintaining a receive window defined by a first edge a and a second edge b, wherein the receive window is maintained as:
a continuous segment with the first edge a as a lower edge and the second edge b as an upper edge if b≥w, where w is a width of the continuous segment; or
an inverse window with the second edge b as a lower edge and the first edge a as an upper edge if b<w;
determining a value i of the TPN relative e of the first edge a or the second edge b of the receive window; and
calculating a packet number (PN) for the packet based on the TPN, the BPN, and the determination.

22. The method of claim 21, wherein determining the value i comprises:
determining whether or not a≤i≤b if the receive window is maintained as a continuous segment with the first edge a as a lower edge and the second edge b as an upper edge; or
determining whether or not b≤i≤a, if the receive window is maintained as an inverse window.

23. The method of claim 21, further comprising, if b≥w:
incrementing BPN by M, if i<a;
calculating the PN of the packet as PN(i)=BPN+i; and
setting b=i, if i<a or if i>b.

24. The method of claim 23, further comprising:
detecting the packet has failed an authentication check; and
in response to the detection, restoring BPN to its value prior to incrementing.

25. The method of claim 21, comprising, if b<w:
calculating the PN of the packet as PN(i)=BPN+i, if i<a;
calculating the PN of the packet as PN(i)=BPN+i−1, if i≥a; and
setting b=i, if i<a and i>b.

26. A wireless station, comprising:
a receiver configured to receive, via at least one antenna, a packet having a transmitted packet number (TPN); and
a processing system configured to:
  maintain a base packet number (BPN),
  maintain a receive window defined by a first edge a and a second edge b, wherein the receive window is maintained, with the first edge a as a lower edge and the second edge b as an upper edge, as:
    a single window with a continuous segment between the lower edge a and upper edge b if $b \geq w$; or
    a split widow with discontinuous segments if $b < w$,
  determine a value i of the TPN relative to at least one of the first edge a or the second edge b of the receive window, and
  calculate a packet number (PN) for the packet based on the TPN, the BPN, and the determination.

\* \* \* \* \*